(12) United States Patent
Lester

(10) Patent No.: US 6,661,115 B2
(45) Date of Patent: Dec. 9, 2003

(54) CONDUCTIVE E-FIELD OCCUPANT SENSING

(75) Inventor: Theodore V. Lester, Schiller Park, IL (US)

(73) Assignee: Motorola, Inc., Schaumburg, IL (US)

( * ) Notice: Subject to any disclaimer, the term of this patent is extended or adjusted under 35 U.S.C. 154(b) by 219 days.

(21) Appl. No.: 09/955,403

(22) Filed: Sep. 12, 2001

(65) Prior Publication Data

US 2003/0047998 A1 Mar. 13, 2003

(51) Int. Cl.[7] .................................................. B60L 1/00
(52) U.S. Cl. ........................ 307/10.1; 180/273; 280/735
(58) Field of Search .................... 307/10.1; 180/273; 280/735; 343/711, 713

(56) References Cited

U.S. PATENT DOCUMENTS

| | | | | |
|---|---|---|---|---|
| 5,019,804 A | * | 5/1991 | Fraden | ........................ 340/562 |
| 5,166,679 A | | 11/1992 | Vranish et al. | |
| 5,936,412 A | | 8/1999 | Gershenfeld et al. | |
| 6,254,127 B1 | * | 7/2001 | Breed et al. | ................. 280/735 |
| 6,329,913 B1 | * | 12/2001 | Shieh et al. | ................. 340/561 |
| 6,469,524 B1 | * | 10/2002 | Oberdier | ...................... 324/688 |
| 6,509,747 B2 | * | 1/2003 | Nagai et al. | .................. 324/687 |
| 6,559,555 B1 | * | 5/2003 | Saitou et al. | ............... 307/10.1 |
| 2001/0020205 A1 | | 9/2001 | Eisenmann et al. | |

FOREIGN PATENT DOCUMENTS

| | | |
|---|---|---|
| GB | 2286247 A | 8/1995 |
| WO | WO97/35738 | 10/1997 |
| WO | WO00/38955 | 7/2000 |

* cited by examiner

Primary Examiner—Gregory J. Toatley, Jr.
Assistant Examiner—Sharon A. Polk
(74) Attorney, Agent, or Firm—Scott K. Pickens; Brian M. Mancini

(57) ABSTRACT

An apparatus (100) for sensing size and location of a vehicle occupant includes a conductor (110) that is electrically coupled to a voltage signal generator (612) and disposed within the seat of the vehicle. The conductor generates a periodic electric field (124). A plurality of sensor electrostatic antennas (120) is disposed adjacent the roof and is capable of sensing at least a portion of the electric field (124). A detection circuit (624) determines the size and location of a vehicle occupant based upon an amount of the electric field (124) incident on each sensor electrostatic antenna (120).

7 Claims, 2 Drawing Sheets

CONDUCTIVE E-FIELD OCCUPANT SENSING

BACKGROUND OF THE INVENTION

1. Field of the Invention

The present invention relates to vehicle sensors and, more specifically, to a vehicle sensor that determines the location and size of an occupant of a vehicle.

2. Description of the Prior Art

The performance of an air bag system, in terms of its success or failure in preventing serious passenger injury, may depend on the size and position of the passenger. For example, if the passenger is seated too far forward or is relatively small, the passenger may be seriously injured by the deployment of the air bag.

Several different types of devices may be used to determine the passenger's position and size. One of these is the capacitive coupling sensor. In such a sensor, a capacitor is formed by a plurality of charged plates surrounding the passenger area of the vehicle. A change in capacitance is caused by the nearby presence of an occupant of a vehicle. An overhead array of capacitive coupling proximity sensors, the signals from which are analyzed by a microprocessor, allows essentially instantaneous and continuous monitoring of passenger position and motion through triangulation based on the distances of the passenger to the various sensors of the array.

One type of capacitive sensor employs a conductor on a seat and other conductors that are disposed about the vehicle body as electrodes. The electrodes and the inter-electrode compartment space in which the person is seated forms a capacitor. Sensing of the inter-electrode capacitance allows determination of the presence and absence of a person in the compartment. When the person takes a seat, the capacitance of the capacitor is increased and the increase in capacitance may be sensed with one of several types of circuit to determine the presence of the passenger. Such capacitive circuits have a disadvantage in that they are susceptible to noise and have a limited range.

Therefore, there is a need for a passenger sensor with a wide range that resists the effects of noise.

DETAILED DESCRIPTION OF THE INVENTION

A preferred embodiment of the invention is now described in detail. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
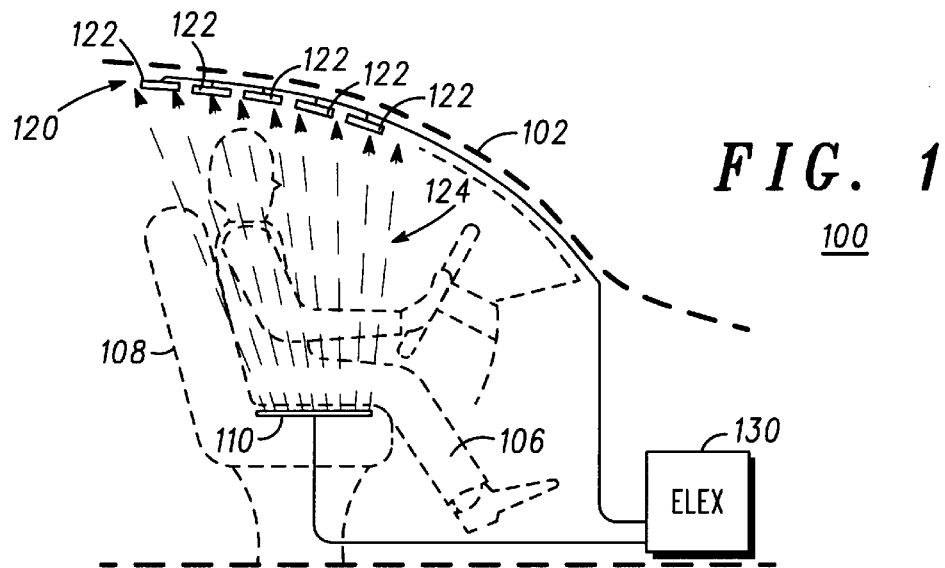
FIG. 1 is a conceptual diagram showing one embodiment of the invention deployed in a vehicle.

As shown in FIG. 1, one embodiment of the invention is an apparatus 100 for sensing the size and the location of a vehicle occupant 106 in a vehicle 102 that includes a roof 104 and a seat 108 upon which the occupant 106 sits. An electronics unit 130 controls the apparatus 100 and includes a voltage signal generator that generates a periodic voltage signal having a first periodicity. A conductor 110 that is electrically coupled to the voltage signal generator is disposed within the seat 108. The conductor 110 generates a periodic electric field 124 that has a periodicity corresponding to the first periodicity of the periodic voltage signal.

Figure 2:
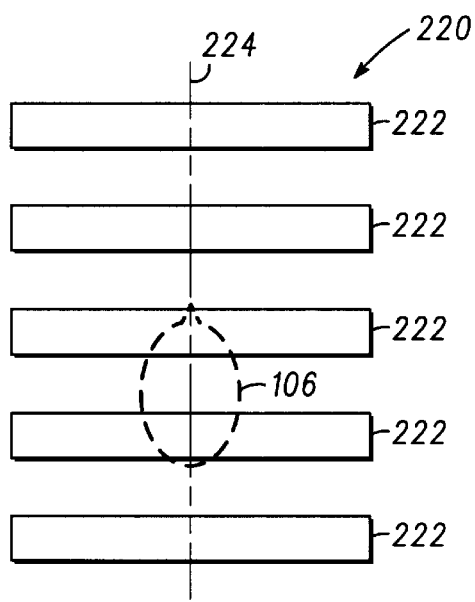
FIG. 2 is a top view of a plurality of strip-type sensor electrostatic antennas.
Figure 3:
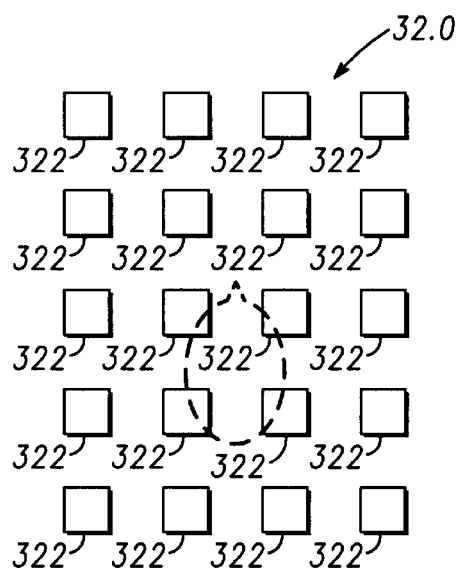
FIG. 3 is a top view of a matrix of sensor electrostatic antennas.

A plurality 120 of sensor electrostatic antennas 122 is disposed adjacent the roof 104 (typically concealed in the headliner). Each sensor electrostatic antenna 122 is capable of sensing at least a portion of the electric field 124. Typically, the electrostatic antennas 122 are thin sheets of a conductive material, such as metal. As shown in FIG. 2, the plurality of electrostatic antennas 220 may include a column of elongated conductive strips 222 that is disposed transverse to the longitudinal axis 224 of the vehicle. As shown in FIG. 3, the plurality of sensor electrostatic antennas 320 could also include a matrix of conductive plates 322. In such an arrangement, the apparatus would be capable of detecting lateral position of the occupant 106 in addition to detecting the forward position of the occupant 106.

Figure 4:
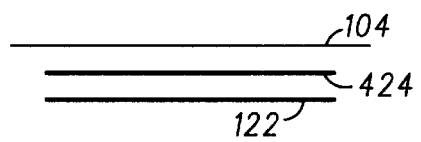
FIG. 4 is a side view of a sensor electrostatic antenna and a first type of guard patch.
Figure 5:
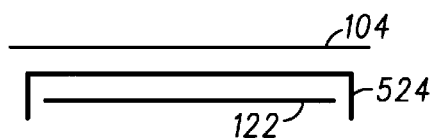
FIG. 5 is a side view of a sensor electrostatic antenna and a second type of guard patch.

To reduce capacitive loading from the roof 104 of the vehicle 102, a guard patch 424, as shown in FIG. 4, is disposed between each sensor electrostatic antenna 122 and the roof 104. The guard patches 424 are made of conductive sheets and may have a periodic signal, corresponding to the periodic voltage signal, applied to them. As shown in FIG. 5, in an alternate embodiment, the guard patch 524 could partially surround the sensor electrostatic antenna 122, thereby focusing the reception of the sensor electrostatic antenna 122 by narrowing its field of view.

Figure 6:
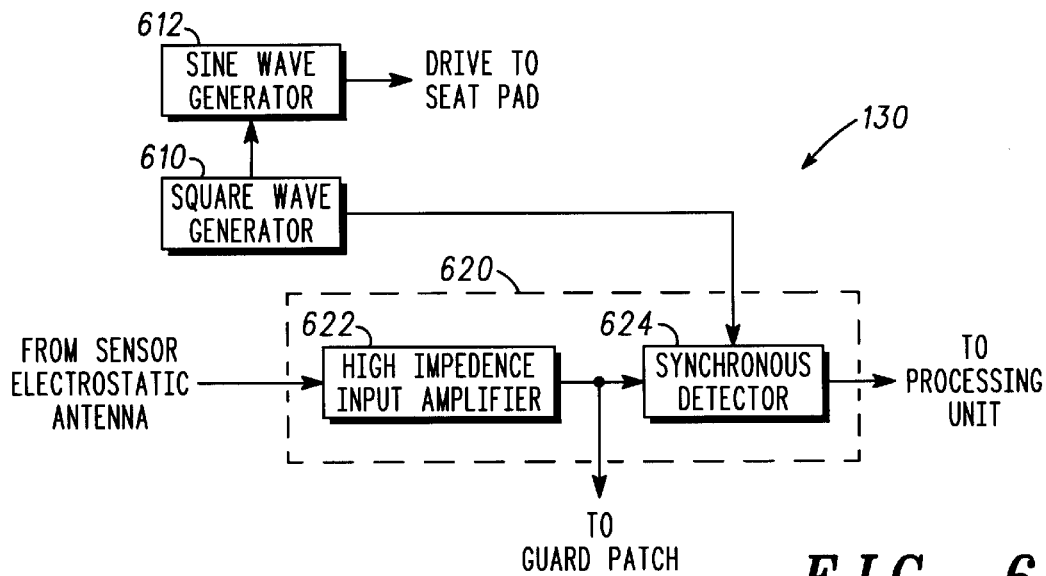
FIG. 6 is a block diagram of a detection circuit employed in one embodiment of the invention.

As shown in FIG. 6, the electronics unit 130 includes a square wave generator 610 that drives both a sine wave generator 612 and a detection circuit 620. The sine wave generator 612, also referred to as a voltage signal generator, generates the periodic voltage signal that is applied to the conductor 110 under the seat pad.

The detection circuit 620 determines the size and location of the vehicle occupant based upon an amount of the electric field incident on each sensor electrostatic antenna. The detection circuit 620 includes a plurality of high impedance amplifiers 622 and a plurality of synchronous detector circuits 624. Each amplifier 622 receives an input from a different one of the sensor electrostatic antennas 122 and generates an amplified signal that that has a value that is proportional to the amount of electric field incident on the corresponding sensor electrostatic antenna 122.

Each of the synchronous detector circuits 624 is responsive to a different amplified signal and to the square wave generator 610 and generates a detection signal that is proportional to the value of the amplified signal when the periodic voltage signal is being asserted. Turning "on" the detection circuit 624 only when the periodic voltage signal to the seat pad conductor 110 is asserted reduces the effects of background noise sensed by the sensor electrostatic antennas 122.

Figure 7:
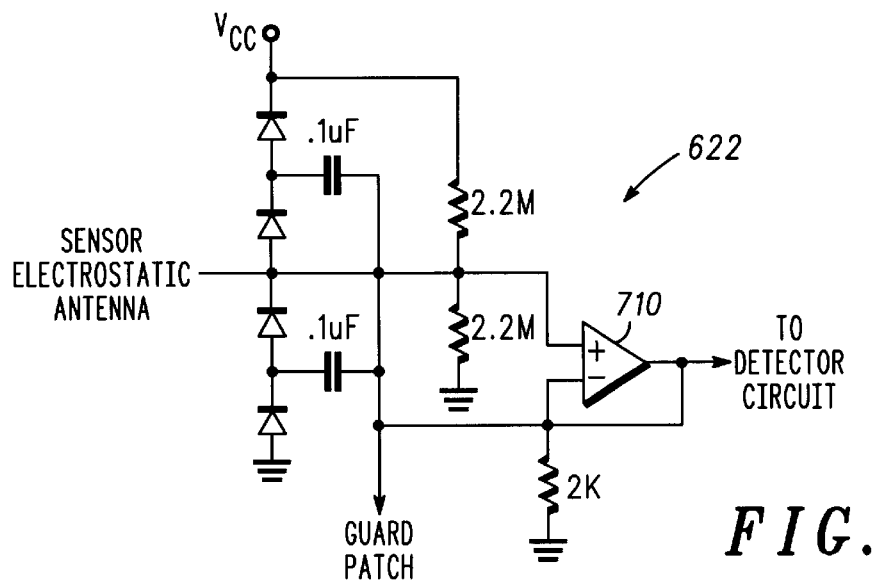
FIG. 7 is a schematic diagram of an amplification circuit employed in one embodiment of the invention.

One embodiment of a high impedance input amplifier 622 is shown in FIG. 7. In this embodiment, an amplifier 710 is biased to provide a high impedance input from the sensor electrostatic antenna 122. The detection signal output of the amplifier 710 is sent to the detector circuit 624 and is also used to drive the corresponding guard patch 424 with a low impedance signal having a frequency, phase, and amplitude corresponding to that of the sensed electrostatic signal. The detection signal is sent to a processing unit, such as a microprocessor, that determines the size and location of the occupant using known geometric algorithms.

The high impedance input amplifiers 622 are voltage followers with 100% feedback to the inverting input. This configuration helps maximize input impedance. With this type of amplifier, common practice is to provide a diode clamp to supply and ground. However, in this high impedance application, the capacitance of the diodes would provide an undesirable load to the input signal. By using pairs of diodes for the clamps and driving the cathode-to-anode junctions with the guard drive signal, the diode capacitance effect is eliminated.

Figure 8:
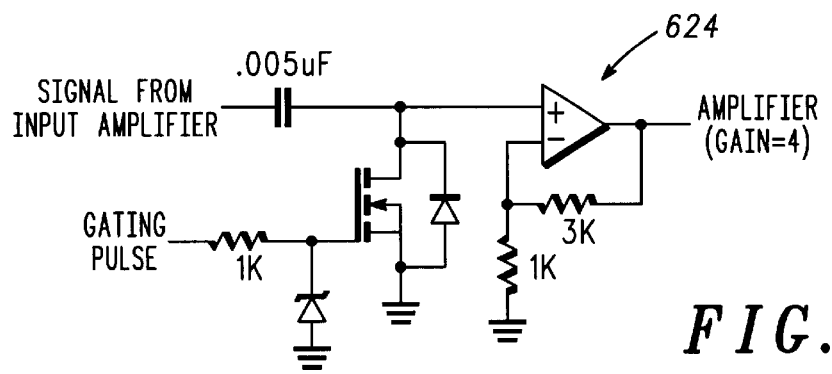
FIG. 8 is a schematic diagram of a detector circuit employed in one embodiment of the invention.

One example of a detector circuit 624 is shown in FIG. 8. Signal detection is done with synchronous detectors. These use semiconductor switches to clamp the negative part of the received signal to ground. This results in efficient rectification, since no diode drops are subtracted from the signal as it is rectified. Synchronous detection takes advantage of knowing the frequency and phase of the signal being received. This allows passing the signal through a gate that only allows signals through that occur in a selected time period. That time period is selected to correspond with the higher value parts of the input signal. This discards low-level signal components (near zero crossing) that have poor signal-to-noise ratio due to their low amplitudes. Additionally, a tuning advantage can be achieved without the use of a tuned circuit since the gate will preferentially allow signals at the chosen frequency and some that are harmonically related, while excluding non-harmonically related signals. The resultant signal is passed through an integrator to form a DC signal for use in amplitude determination of the received signal. Besides helping to form a DC signal, the integrator helps eliminate signals that pass through the gate but are not harmonically related to the original signal. Since the "empty" spaces after gating contain no noise, including them in the integration time does not impair signal-to-noise as would including those periods of received signal corrupted with noise.

In operation, the method of the invention operates on the conduction principle. A low voltage signal, for example 5V peak-to-peak 125 KHz, drives the conductive mat 110 in the seat pad of the vehicle 106. If a person is seated in the seat 108, an amount of the signal will be coupled to the sensor electrostatic antennas. The amount of signal each sensor electrostatic antenna receives depends on the distance from the sensor electrostatic antenna to the body of the passenger. A short passenger will couple less signal than a tall one. In any case, the sensor electrostatic antenna closest to the passenger will receive the greatest signal. By comparing the signals received by the sensor electrostatic antennas, a determination of the head position and height of the passenger can be made.

Additional sensor electrostatic antennas may be placed in doors, armrests, the airbag door, or any other location in the vehicle to enable passenger distance estimation from these points. A matrix of sensor electrostatic antennas in the seat can be used to estimate passenger mass, and thereby avoid using weight measurement techniques, which may be difficult to install and calibrate.

At least a portion of the circuitry, e.g., high impedance amplifiers, may be deployed at the sensor electrostatic antennas. This may be beneficial because it may be difficult to carry a high impedance signal through cable to an electronics unit. Also, performing signal processing at the sensor electrostatic antennas in the headliner could result in a reduction of the amount of cabling required to convey the signal data to the microprocessor unit. Signal multiplexing would be one way to accomplish this. It can permit using a single cable to carry the data.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for sensing size and location of a vehicle occupant, the vehicle including a roof and a seat upon which the occupant may sit, the apparatus comprising:

(a) a voltage signal generator that generates a periodic voltage signal having a first periodicity;

(b) a conductor, electrically coupled to the voltage signal generator and disposed within the seat, the conductor capable of generating a periodic electric field having a periodicity corresponding to the first periodicity of the periodic voltage signal;

(c) a plurality of sensor electrostatic antennas disposed adjacent the roof, each sensor electrostatic antenna capable of sensing at least a portion of the electric field;

(d) a detection circuit that determines the size and location of a vehicle occupant based upon an amount of the electric field incident on each sensor electrostatic antenna, the detection circuit comprising:

i. a plurality of high impedance amplifiers, each amplifier having a first input and a second input, the first input of each amplifier electrically coupled to a different one of the plurality of sensor electrostatic antennas so as to be capable of sensing the amount of the electric field incident on the corresponding sensor electrostatic antenna, each amplifier capable of generating an amplified signal that has a value that is proportional to the amount of electric field incident on the corresponding sensor electrostatic antenna; and ii. a plurality of synchronous detector circuits, each synchronous detector circuit responsive to a different amplified signal and to the voltage signal generator so as to generate a detection signal that is proportional to the value of the amplified signal when the periodic voltage signal is being asserted.

2. The apparatus of claim 1, further comprising a plurality of guard patches, each guard patch disposed between a corresponding sensor electrostatic antenna and the roof, wherein each guard patch shields the sensor electrostatic antenna from the roof.

3. The apparatus of claim 2, wherein the detection signal is fed back to the second input and is electrically coupled to the corresponding guard patch so as to generate a low impedance source signal sufficient to reduce capacitive loading from the roof.

4. The apparatus of claim 1, wherein the vehicle has a longitudinal axis and wherein each sensor electrostatic antenna comprises an elongated conductive strip that is disposed transverse to the longitudinal axis.

5. The apparatus of claim 1, wherein the plurality of sensor electrostatic antennas includes a matrix of conductive plates.

6. A method of sensing size and location of an occupant of a vehicle, having a roof, comprising the steps of:
   (a) directing an electric field from a first side of the occupant through the occupant;
   (b) sensing an intensity of the electric field with a plurality of sensor electrostatic antennas disposed at predetermined locations on a second side of the occupant, opposite the first side; and
   (c) determining the size and location of the occupant based on the intensity of the electric field incident on each of the sensor electrostatic antennas.

7. The method of claim 6, further comprising the step of applying a plurality of guard signals to a corresponding plurality guard patches, each guard patch being disposed between a corresponding one of the plurality of sensor electrostatic antennas and the roof, so as to reduce capacitive loading by the roof.

* * * * *